United States Patent

Buback et al.

Patent Number: 5,006,609
Date of Patent: Apr. 9, 1991

[54] PREPARATION OF CYANO-CONTAINING COPOLYMERS BASED ON ETHYLENE

[75] Inventors: Michael Buback, Bovenden; Stefan Rohde, Goettingen, both of Fed. Rep. of Germany

[73] Assignee: BASF Aktiengesellschaft, Ludwigshafen, Fed. Rep. of Germany

[21] Appl. No.: 462,705

[22] Filed: Jan. 9, 1990

[30] Foreign Application Priority Data

Jan. 27, 1989 [DE] Fed. Rep. of Germany ....... 3902389

[51] Int. Cl.$^5$ ................................................. C08F 8/30
[52] U.S. Cl. .................................... 525/378; 525/330.5
[58] Field of Search .......................................... 525/378

[56] References Cited

U.S. PATENT DOCUMENTS

| | | | |
|---|---|---|---|
| 2,313,565 | 3/1941 | McDowell et al. | 525/378 |
| 3,284,425 | 11/1966 | Schroder et al. | 525/378 |
| 3,337,488 | 8/1967 | Lyons et al. | 525/378 |
| 3,337,517 | 8/1967 | Anspon | 525/378 |
| 3,429,860 | 2/1969 | Hurst | 525/378 |
| 3,485,785 | 12/1969 | Anspon et al. | |
| 3,557,070 | 1/1971 | Anspon et al. | 525/378 |
| 3,674,761 | 7/1972 | Anspen et al. | 525/378 |
| 4,116,784 | 9/1978 | Hosoi et al. | |
| 4,246,374 | 1/1981 | Kopchik | 525/378 |
| 4,816,524 | 3/1989 | Anzai et al. | 525/378 |

*Primary Examiner*—Bernard Lipman
*Attorney, Agent, or Firm*—Keil & Weinkauf

[57] ABSTRACT

A product which is suitable for producing films and moldings and for use as a coating agent comprises a cyano-containing copolymer A based on ethylene composed of (a) predominant proportions of the structural unit of ethylene, (b) minor proportions of the structural unit of the general formula Ia

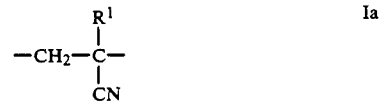

where $R^1$ is hydrogen or $C_1$-$C_4$-alkyl, and (c) optional structural units derived from other comonomers, which is prepared by reacting a base copolymer B formed from predominant proportions of ethylene, minor proportions of an $\alpha, \beta$-unsaturated carboxylic ester of the general formula Ib

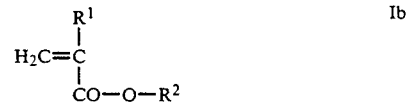

where $R^2$ is $C_1$-$C_8$-alkyl, and further, optional comonomers, with ammonia at 120°-280° C. and 150-2,500 bar.

1 Claim, No Drawings

PREPARATION OF CYANO-CONTAINING COPOLYMERS BASED ON ETHYLENE

The present invention relates to a process for preparing a cyano-containing copolymer A based on ethylene which is composed of (a) predominant proportions of the structural unit of ethylene,
(b) minor proportions of the structural unit of the general formula Ia

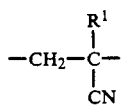

where $R^1$ is hydrogen or $C_1$–$C_4$-alkyl, and
(c) optional structural units derived from other comonomers.

It is known from JP-B-68/18,450, JP-B-71/03,071, JP-B-85/23,682 and U.S. Pat. No. 4,116,784 to prepare copolymers of ethylene and acrylonitrile by free radical polymerization. The disadvantage of these processes, however, is that the two monomers do not copolymerize readily with each other and that they only produce relatively low molecular weight copolymers which are of only limited commercial interest.

It is also known to react copolymers of ethylene and acrylic or methacrylic esters with ammonia in a polymer-analogous reaction (U.S. Pat. No. 3,337,517, U.S. Pat. No. 3,485,785, FR-A-1,501,193). In this reaction, which is carried out at 180–300° C. and at up to 60 bar, the alkoxycarbonyl groups from the acrylic or methacrylic ester are wholly or partly replaced by carboxamido groups.

It is an object of the present invention to provide a technically simpler and more economical process for arriving at copolymers which are composed of the structural units of ethylene, acrylonitrile or α-alkylacrylonitriles and other, optional comonomers. Further objects of the present invention are the copolymers obtainable thereby and the use thereof for producing films and moldings and as coating materials.

We have found that these objects are achieved by a process for preparing a cyano-containing copolymer A based on ethylene which is composed of (a) predominant proportions of the structural unit of ethylene,
(b) minor proportions of the structural unit of the general formula Ia

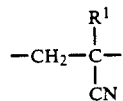

where $R^1$ is hydrogen or $C_1$–$C_4$-alkyl, and
(c) optional structural units derived from other comonomers, which comprises reacting a base copolymer B formed from predominant proportions of ethylene, minor proportions of an α,β-unsaturated carboxylic ester of the general formula Ib

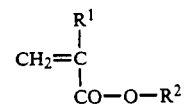

where $R^2$ is $C_1$–$C_8$-alkyl, and further, optional comonomers, with ammonia at 120–280° C. and 150–2,500 bar.

The proportion of ethylene units in the copolymer according to the present invention is preferably from 55 to 95 mol %, the proportion of units Ia being from 5 to 40 mol %, and the proportion of units of the other comonomers is up to 40, in particular up to 20, mol %. Particular preference is given to a copolymer comprising 80–95 mol % of ethylene units and 5–20 mol % of units Ia. The starting point for the process according to the present invention is accordingly a base copolymer B of the right composition for obtaining these molar ratios.

These base copolymers are known or obtainable in a known manner by free radical polymerization in virtually any desired degree of polymerization, but the degree of polymerization preferably corresponds to average molecular weights of from 10,000 to 200,000.

Comonomers Ib of base copolymers B are primarily the esters of acrylic acid and of methacrylic acid, but also of acids where $R^1$ is higher alkyl such as ethyl, n-propyl or n-butyl. Since the alcohol radical $R^2$ is in any case re-eliminated from these esters, its chemical nature is of minor significance, but preference is in general given in particular to the methyl ester but also to the ethyl, n-propyl and n-butyl ester.

Further comonomers from which the copolymers according to the present invention and hence also the base copolymers B can be formed are for example $C_4$–$C_6$-olefins, such as 1-butene, 1-pentene and 1-hexene, aromatic vinyls such as predominantly styrene, unsaturated alcohols such as allyl alcohol and bifunctional monomers such as, in particular, butadiene and isoprene.

If the polymer-analogous reaction with ammonia is not taken to completion, the copolyemrs A according to the present invention may also contain amide functions or the original ester groups.

The process according to the present invention is carried out at 120–280° C. and 150–2,500 bar. The preferred conditions are 200–260° C. and 1,000–2,000 bar. Under these conditions, the ammonia used is present in a fluid form, ie. in a supercritical state. It is advisable to introduce the base copolymer B as the initial charge and then to add the ammonia.

The amount of ammonia depends on the degree of conversion desired for the ester groups, and therefore is at least equimolar to the number of groups to be converted. Since, in general, complete conversion will be sought, it is advisable to use the ammonia in a molar excess of up to 100 times in order to speed up the reaction. Still higher excesses may be of advantage since the fluid ammonia acts as a solvent for the polymer.

First, the ester groups present in the copolymer react with the ammonia to give amide derivatives. These eliminate water to form the corresponding nitriles. The reaction is continued until the predominant number of amide function intermediates have been dehydrated to nitrile functions, which can be monitored by spectroscopic methods, for example by infrared or nuclear magnetic resonance spectroscopy. For implementation on an industrial scale, the precise length of reaction can be determined by a few preliminary runs. The reaction time is customarily within the range from 2 to 50 hours, in general less than 30 hours. Since the reaction is a heterogeneous reaction, the rate of reaction incidentally depends critically on the degree of mixing of base copolymer B with the ammonia. The reaction is therefore preferably carried out in stirred autoclaves or extruders, in which case the reaction time can be shortened to a few minutes.

Furthermore, it is advisable to use inert solvents such as, for example, toluene or ethylbenzene in order thereby to reduce the viscosity of the copolymer and hence to facilitate its dispersibility in the ammonia phase.

The copolymers obtainable according to the present invention are thermoplastic and are highly suitable for producing high grade films and moldings by any conventional shaping technique, in particular by injection molding. These polymers are also suitable in the form of dispersions or solutions for use as coating agents for articles of any kind, whether for protective or decorative purposes.

The process according to the present invention offers the advantage that it makes available a large number of cyano-containing copolymers based on ethylene by an industrially practicable technique and also that it eliminates the need to use toxic nitrile monomers such as acrylonitrile which would be required for direct copolymerization of the nitriles, of ethylene and of the other monomers.

EXAMPLE 2 g of a random copolymer composed of 92.2 mol % of ethylene and 7.8 mol % of n-butyl acrylate and having an average molecular weight of 25,000 were introduced into an autoclave as initial charge and then reacted with 30 g of ammonia at 250° C and 1,500 bar. Reaction for 24 hours gave a copolymer in which 51.3% of the n-butoxycarbonyl groups had been replaced by nitrile groups, as was confirmed by infrared spectroscopy. After 48 hours, reaction, the corresponding nitrile group content was 88.5%.

We claim:

1. A process for preparing a cyano-containing copolymer A based on ethylene which is composed of
   (a) predominant proportions of the structural unit of ethylene,
   (b) minor proportions of the structural unit of the formula Ia

where $R^1$ is hydrogen or $C_1$-$C_4$-alkyl, and
   (c) optional structural units derived from other comonomers, which process comprises; reacting a base copolymer B formed from predominant proportions of ethylene, minor proportions of an α,β-unsaturated carboxylic ester of the formula Ib

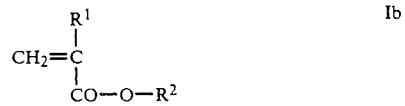

where $R^2$ is $C_1$-$C_8$-alkyl, and further, optional comonomers, with ammonia at 120–280° C. and 150–2,500 bar.

* * * * *